United States Patent [19]
Wilkinson et al.

[11] 3,804,644
[45] Apr. 16, 1974

[54] CERAMIC GREEN MIX

[75] Inventors: Horace A. Wilkinson, Lilli Pilli;
Theodore A. Wilkinson,
Turramurra, New South Wales,
both of Australia

[73] Assignee: **Monier Research & Development
Pty., Ltd.,** Villawood, New South
Wales, Australia

[22] Filed: Dec. 17, 1970

[21] Appl. No.: 99,242

Related U.S. Application Data

[63] Continuation of Ser. No. 707,285, Feb. 21, 1968, abandoned.

[30] Foreign Application Priority Data
Mar. 7, 1967  Australia............................ 18566/67

[52] U.S. Cl..................... 106/45, 106/67, 106/73.4, 106/73.6, 264/176
[51] Int. Cl............................................ C04b 35/02
[58] Field of Search.......... 106/39 R, 40, 45, 67, 71, 106/39.5, 73.4, 73.6; 264/56, 45

[56] References Cited
UNITED STATES PATENTS

| | | | |
|---|---|---|---|
| 1,094,727 | 4/1914 | Lauffer............................. | 106/39 R |
| 2,543,548 | 2/1951 | Henry et al......................... | 106/67 |
| 2,726,964 | 12/1955 | Smoke.................................. | 106/45 |
| 3,199,992 | 8/1965 | Moffitt.............................. | 106/39 R |
| 3,700,472 | 10/1972 | Tauber............................. | 106/45 X |

FOREIGN PATENTS OR APPLICATIONS

| | | | |
|---|---|---|---|
| 1,086,581 | 10/1967 | Great Britain........................ | 264/56 |
| 619,061 | 3/1949 | Great Britain | |

OTHER PUBLICATIONS

Tauber–"Basalt Makes Inexpensive Stoneware and Architectural Shapes"–Ceramic Industry, Vol. 86, No. 4, April 1966.

*Primary Examiner*—Helen M. McCarthy

[57] ABSTRACT

Ceramic green mix suitable for pressure molding and extrusion techniques consists of basic igneous rocks free of free quartz (basalt, dolerite, gabbro), clay 10–20% by weight of rocks, and water 4 to 9 parts per 10–20 parts of clay, respectively.

2 Claims, No Drawings

CERAMIC GREEN MIX

This application is a continuation of co-pending application Ser. No. 707,285, filed Feb. 21, 1968, and now abandoned.

This invention relates generally to mixtures used in manufacturing ceramic products. It also relates to the products such as pipes, tiles, bricks and blocks produced from the mixture.

Whilst the provisional specification filed on 7 Mar. 1967, indicated that the invention related to igneous rocks in general, the use of basic igneous rocks has advantages over the use of acid igneous rocks and the present invention is now restricted to the use of basic igneous rocks.

Acid igneous rocks e.g. granite and rhyolite contain substantial quantities of free quartz and may also contain substantial quantities of micaceous minerals of which typical examples are muscovite and biotite. Fired ware made from these rocks tends to crack on cooling due to the inversions of the quartz, which results in change of crystal size. In addition dehydration of the micaceous minerals causes exfoliation of these minerals which results in unsound and unsatisfactory ware.

The present invention is directed to basic igneous rocks e.g. basalt, dolerite and gabbro which do not contain free quartz. In order to simplify matters the invention will be described with particular reference to basaltic rocks but it should be clearly understood that other basic igneous rocks may be used.

In its broadest aspect the present invention is a dry mixture which is used for forming a green mixture which in turn is used for the manufacture of the ceramics, said dry mixture comprising basic igneous rocks and clay.

By the addition of a relatively small amount of water the dry mixture is converted into the green mixture.

The green mixture is characterised by having a low clay/water ratio, which ratio lies between 2 to 1 and 3 to 1.

The present invention also relates to ceramic products produced by firing the green mixture. The present invention also relates to a process for the production of ceramic products.

Whilst the water content varies to some extent with the basic igneous rock ingredient, the clay/water ratio is the most important factor.

The green mixture, even with the maximum amount of water present which is envisaged by the present invention, resembles earth which is only slightly damp.

Green products formed by moulding the green mixture have a very high density; for example 160–165 lbs. per cubic foot which on firing, yields a dense ceramic having a density of 145 lbs. per cubic foot.

Throughout this specification the word "parts" is to be interpreted as meaning "parts by weight".

One specific green mixture contains 80 parts basaltic rock fines, 20 parts clay and 9 parts water. This mixture illustrates a clay/water ratio of approximately 2.2 to 1.

Strangely enough, if the water content is greatly exceeded the mixture becomes too plastic for accurate pressure moulding and deforms too easily during shaping. Also if the water content is too high, undesirable plastic deformation can occur during handling of the moulded green product.

Another specific green mixture contains 90 parts basaltic rock (which is composed of particle sizes varying from three-fourths inch to dust), 10 parts clay and 4 parts water. This mixture illustrates a clay/water ratio of 2.5 to 1.

The present invention includes other mixtures having proportions of basaltic rock, clay and water similar to the proportions referred to above. The clay/water ratio must lie generally between 2 to 1 and 3 to 1.

The table No. 1 below illustrates the composition of 4 additional green mixtures:

TABLE 1

|    | Water Content | Clay | Fine Basaltic Rock ⅛" – Dust | Coarse Basaltic Rock ⅛" – ½" |
|----|---------------|----------|----------|----------|
| 1. | 9 Parts | 20 Parts | 80 Parts | — |
| 2. | 7 Parts | 15 Parts | 85 Parts | — |
| 3. | 6 Parts | 15 Parts | 40 Parts | 45 Parts |
| 4. | 4 Parts | 10 Parts | 40 Parts | 50 Parts |

An example of a suitable grading of basaltic rock dust is shown below:

| B.S. Seive Size | Cumulative % Retained. |
|---|---|
| 7 mesh | 0 |
| 14 mesh | 15 |
| 25 mesh | 36 |
| 53 mesh | 55 |
| 100 mesh | 73 |
| passing 100 mesh | 27 |

It should be realised that the percentage of basaltic rock may be as high as 90%. Similarly, a high percentage of coarse particles, e.g. 40 to 60% of particles ranging in size from three-fourths inch to one-eighth inch may be used, the remaining portion of the basaltic rock constituent consisting of fines, (including powder).

We consider that the use of such large coarse particle sizes is a radical departure from other known mixtures in the ceramic art.

The low moisture content of the green mixture precludes the use of the mixture as a slip in a slip casting process and the disadvantages of slip casting are avoided. Consequently, in practice, the present invention is clearly and readily distinguishable from the well known prior art of slip casting.

When the green mixture is subjected to a suitable packing or compressing action, the mixture is immediately formed into a dense coherent product which without any drying at all has sufficient inherent strength and is sufficiently self-supporting to allow it to be immediately removed from the mould and handled for further processing e.g. firing in a kiln.

Many of the problems of the prior art are overcome by the low water content of the present invention, e.g.

1. The green moulded product does not require appreciable drying before firing in a kiln which drying tends to slow down the rate of manufacture. The drying step is completely eliminated in the present invention.

2. Problems relating to shrinkage are substantially removed and the first product is characterised by accurate dimensions.

3. It is unnecessary to use porous moulds as in slip casting in order to remove some of the water content.

4. The basaltic rock is evenly dispersed throughout the fired product, whereas in slip casting the heavier basaltic rock tends to settle at the bottom of the slip, which slip may require a water content as high as 30%.

5. In view of the lower water content, less heat is required to dry and fire the product which results in an economic advantage.

6. The present invention lends itself to the quick continuous, mass production of ceramic products.

During firing, the basic igneous rock and/or the clay fuses to bond the other material into a coherent mass, having a high acid resistance, excellent mechanical properties and heat shock resistance.

The final physical and chemical properties of the porduct vary with the final firing temperature.

In general 1,000° – 1,125°C yield materials suitable for building materials and firing temperature of 1,100° to 1,200°C yielding denser and more abrasive resistant material for refractory and engineering products such as flue linings.

The conventional apparatus, including vibrating packers which are used to manufacture concrete blocks or tiles, may with slight modifications be used to manufacture ceramic blocks or tiles from the mixture which forms the subject of the present invention. In accordance with the present invention, however, such ceramic blocks or tiles have the advantage that they may readily be glazed but on the other hand it is not practical to glase the corresponding concrete products of the prior art. One disadvantage in working with concrete is that the concrete must be given time to set before handling the products whereas there is no corresponding delay in the present invention.

Other raw materials may be incorporated in the primary mix with advantages to the firing range and densification. Such materials as pulverised silica, fluxes etc. fall in this category. Deflocculating agents may be added.

The present invention is particularly suited to the manufacture of both small and large diameter ceramic pipes, and a packer head machine suitable for this purpose will now be described.

The packer head apparatus consists of a cylindrical mould having internally associated therewith a packer head wht depending skirt which is capable of rotating as a unit relative to the cylindrical mould, while being moved upwardly at a controlled rate of travel directly above the pipe which is being progressively formed from a pipe mix fed from above into the annular space between the said skirt and the cylinder. The lower face of the peripheral portion of the packer head plate is provided with a series of circumferentially spaced ramps or "thread" starts which tamp the upper face of pipe mix fed past the packer head into that portion of the cylinder immediately below it. The skirt functions to form the interior surface of the pipe and, if desired, may be differentially driven in relation to the packer head so that both the head and the skirt may rotate at any desired relative speeds which are dictated by any instantaneous circumstances. The newly formed pipe may be removed from the cylindrical mould by applying pressure to one end of the pipe and forcing the pipe out of the mould.

We have discovered that the compressed or compacted material of the newly formed but unfired pipe will flow under pressure and this permits suitable shaping of the ends of the pipe to incorporate provision for joining adjacent pipe ends. This working of the material obviously must be done before the pipes have been fired in the kiln.

The cylindrical surfaces (inner and external) of pipes produced by the packer head machine have a remarkably smooth finish and are accurately dimensioned.

What is claimed is:

1. A green, slightly damp, mixture adapted for the manufacture of dense ceramic products by pressure molding or extrusion techniques which mixture has a low moisture content so as not to constitute a slip and which mixture after being compressed and without drying is self-supporting in the green state, said mixture consisting essentially of an admixture of a dry mix of comminuted basic igneous rock, substantially free of free quartz, and clay, wherein said basic igneous rock is unhydrated and is selected from the group consisting of basalt, dolerite and gabbro and mixtures thereof, said mix being composed of from about 80–90% by weight of said rock and 20–10% by weight of clay, with from about 4–9 parts of water per 10–20 parts by weight of clay, respectively.

2. A mixture according to claim 1 in which about 40% to 60% by weight of said rock is present as fine particles having a varying particle size of one-eighth inch to dust and the remainder of the rock is in the form of coarse particles having a varying particle size of three-fourth inch to one-eighth inch.

* * * * *